(12) United States Patent
Braun

(10) Patent No.: US 12,100,222 B2
(45) Date of Patent: Sep. 24, 2024

(54) METHOD AND DEVICE FOR OPERATING A VIDEO MONITORING SYSTEM FOR A RAIL VEHICLE

(71) Applicant: Siemens Mobility GmbH, Munich (DE)

(72) Inventor: Thorsten Braun, Bubenreuth (DE)

(73) Assignee: Siemens Mobility GmbH, Munich (DE)

( * ) Notice: Subject to any disclaimer, the term of this patent is extended or adjusted under 35 U.S.C. 154(b) by 460 days.

(21) Appl. No.: 17/620,244

(22) PCT Filed: May 27, 2020

(86) PCT No.: PCT/EP2020/064637
§ 371 (c)(1),
(2) Date: Dec. 17, 2021

(87) PCT Pub. No.: WO2020/254076
PCT Pub. Date: Dec. 24, 2020

(65) Prior Publication Data
US 2022/0366698 A1    Nov. 17, 2022

(30) Foreign Application Priority Data
Jun. 17, 2019    (DE) ............ 10 2019 208 770.1

(51) Int. Cl.
*B61L 15/00*    (2006.01)
*B61L 23/00*    (2006.01)
(Continued)

(52) U.S. Cl.
CPC .............. *G06V 20/56* (2022.01); *B61L 23/00* (2013.01); *G06V 20/59* (2022.01); *H04L 67/12* (2013.01)

(58) Field of Classification Search
CPC ........ G06V 20/56; G06V 20/59; B61L 23/00; B61L 15/0027; H04L 67/12
See application file for complete search history.

(56) References Cited

U.S. PATENT DOCUMENTS 5,978,718 A * 11/1999 Kull ................. B61L 29/00
701/19
6,011,901 A * 1/2000 Kirsten ............. H04N 7/181
348/E7.086

(Continued)

FOREIGN PATENT DOCUMENTS

CN    109429039 A    3/2019
DE    102011113340 A1    3/2013

(Continued)

OTHER PUBLICATIONS

SDN_Framework_for_Improving_the_Performance_of_Underprovisioned_IP_Video_Surveillance_Networks, Sharleen Joy Y. Go*, Cedric Angelo M. Festin, and Wilson M. Tan. 2018 15th International Symposium on Pervasive Systems, Algorithms and Networks (Year: 2018).*

(Continued)

*Primary Examiner* — Chris Parry
*Assistant Examiner* — Hassan A Khan
(74) *Attorney, Agent, or Firm* — Laurence A. Greenberg; Werner H. Stemer; Ralph E. Locher

(57) ABSTRACT

A method for operating a video monitoring system for a rail vehicle includes determining a topology of a signaling network assigned to the video monitoring system, and identifying nodes signal-coupled to the network. At least one video camera and at least one video recorder are nodes of the network. A signal path for the at least one video camera of the network is determined on the basis of the determined topology of the network. The signal path represents a signal arbitration or signaling-related assignment of the at least one (Continued)

video camera. The at least one video camera is automatically assigned to the at least one video recorder on the basis of the determined signal path. A device for operating a video monitoring system for a rail vehicle and a rail vehicle are also provided.

10 Claims, 2 Drawing Sheets

(51) Int. Cl.
*G06V 20/56* (2022.01)
*G06V 20/59* (2022.01)
*H04L 67/12* (2022.01)

(56) References Cited

U.S. PATENT DOCUMENTS

| | | | | |
|---|---|---|---|---|
| 6,088,635 | A * | 7/2000 | Cox | B61L 23/041 |
| | | | | 701/19 |
| 6,532,038 | B1 * | 3/2003 | Haring | B61L 23/041 |
| | | | | 348/148 |
| 7,742,873 | B2 * | 6/2010 | Agnew | G01C 21/3492 |
| | | | | 701/465 |
| 8,264,539 | B2 * | 9/2012 | Takada | B61L 15/0094 |
| | | | | 348/148 |
| 2005/0091110 | A1 * | 4/2005 | Hentz | G06Q 30/0267 |
| | | | | 348/143 |
| 2006/0136624 | A1 * | 6/2006 | Takano | H04N 5/765 |
| | | | | 710/62 |
| 2006/0178142 | A1 * | 8/2006 | Lovberg | H04B 1/38 |
| | | | | 455/431 |
| 2008/0100706 | A1 * | 5/2008 | Breed | B60R 21/01536 |
| | | | | 348/143 |
| 2008/0309762 | A1 * | 12/2008 | Howard | G07C 5/0891 |
| | | | | 348/148 |
| 2009/0189981 | A1 * | 7/2009 | Siann | H04N 7/183 |
| | | | | 348/143 |
| 2009/0304046 | A1 * | 12/2009 | Nadler | H04B 7/155 |
| | | | | 375/141 |
| 2010/0002082 | A1 * | 1/2010 | Buehler | G08B 13/19645 |
| | | | | 348/E7.085 |
| 2010/0020175 | A1 * | 1/2010 | Takada | B61L 15/0081 |
| | | | | 348/148 |
| 2011/0043631 | A1 * | 2/2011 | Marman | H04N 5/772 |
| | | | | 386/224 |
| 2011/0069170 | A1 * | 3/2011 | Emoto | H04N 7/181 |
| | | | | 348/E7.086 |
| 2011/0216200 | A1 * | 9/2011 | Chung | H04N 7/183 |
| | | | | 348/148 |
| 2013/0058253 | A1 * | 3/2013 | Maruta | H04L 67/12 |
| | | | | 370/254 |
| 2014/0074987 | A1 * | 3/2014 | Martz | H04L 67/10 |
| | | | | 709/219 |
| 2015/0062335 | A1 * | 3/2015 | Murakami | H04N 23/66 |
| | | | | 348/143 |
| 2015/0281652 | A1 * | 10/2015 | Morimoto | H04L 67/12 |
| | | | | 348/148 |
| 2016/0110993 | A1 * | 4/2016 | Marlatt | G08B 13/1968 |
| | | | | 340/4.33 |
| 2016/0255310 | A1 * | 9/2016 | Min'Kovskiy | B61L 27/40 |
| | | | | 386/224 |
| 2017/0013237 | A1 * | 1/2017 | Ito | B61D 1/00 |
| 2018/0054590 | A1 * | 2/2018 | Mok | H04N 21/4223 |
| 2019/0122052 | A1 * | 4/2019 | Miyake | G06V 20/52 |
| 2020/0273268 | A1 * | 8/2020 | Bhattacharyya | |
| | | | | G06Q 10/06315 |
| 2021/0092074 | A1 * | 3/2021 | Yousefi | H04W 24/08 |
| 2021/0297592 | A1 * | 9/2021 | Axson | H04N 7/181 |
| 2022/0063689 | A1 * | 3/2022 | Kumar | H04W 4/40 |
| 2022/0114894 | A1 * | 4/2022 | Farnham, IV | G07C 5/008 |

FOREIGN PATENT DOCUMENTS

| | | | | |
|---|---|---|---|---|
| EP | | 1903800 A1 | 3/2008 | |
| EP | | 2571265 A2 | 3/2013 | |
| EP | | 2571265 B1 * | 11/2016 | H04N 7/183 |
| GB | | 2502922 A | 12/2013 | |
| JP | | 2012085158 A | 4/2012 | |

OTHER PUBLICATIONS

Go Sharleen Joy et al: "An SDN-based Framework for Improving the Performance of Underprovisioned IP Video Surveillance Networks", 2018 15TH International Symposium On Pervasive Systems, Algorithms and Networks , IEEE, 16. Oct. 2018, pp. 154-161, XP033514470, DOI: 10.1109/I-SPAN.2018.00033;.

Mohammadi Reza et al.: "An adaptive type-2 fuzzy traffic engineering method for video surveillance systems over software defined networks", Multimedia Tools and Applications, Kluwer Academic Publishers, Boston, US, Bd. 76, Nr. 22, 22. Nov. 2016, pp. 23627-23642, XP036349495, ISSN: 1380-7501, DOI: 10.1007/S11042-016-4137-0;.

* cited by examiner

METHOD AND DEVICE FOR OPERATING A VIDEO MONITORING SYSTEM FOR A RAIL VEHICLE

FIELD AND BACKGROUND OF THE INVENTION

The invention relates to a method and a device for operating a video monitoring system for a rail vehicle. The invention further relates to a rail vehicle having such a device.

Rail vehicles designed for passenger transportation include surveillance systems that are deployed for example as digital video systems for recording the interior of a vehicle. Typically, such a video system is connected to a data network for the purpose of transmitting the acquired video signals. In this regard it is necessary to take account of data security and data privacy requirements.

SUMMARY OF THE INVENTION

An object of the present invention is to provide a method and a device for operating a video monitoring system for a rail vehicle, which method and device are in each case able to make a contribution toward reliable data processing and safe operation of the rail vehicle.

The object is achieved by means of a method and a device for operating a video monitoring system for a rail vehicle that possess the features of the respective independent claim. Advantageous embodiments of the method are disclosed in the dependent claims.

According to an aspect of the invention, a method for operating a video monitoring system for a rail vehicle comprises the steps of determining a topology of a signaling network which is assigned to the video monitoring system. The method comprises identifying nodes which are coupled to the network for signaling purposes, wherein at least one video camera and one video recorder form a respective node of the network. The method further comprises a step of determining a signal path for the at least one video camera of the network on the basis of the determined topology of the network. The signal path represents a signaling-oriented allocation of the at least one video camera to a video recorder. The method further comprises a step in which the at least one video camera is automatically assigned to the at least one video recorder on the basis of the determined signal path.

By means of the described method it is possible to provide reliable and secure data processing of video signals of a video monitoring system and to make a contribution toward the safe operation of a rail vehicle.

The video monitoring system comprises for example a digital video system for recording an interior of the rail vehicle, such a system also being referred to as a CCTV (closed-circuit television) video surveillance system. The video monitoring system further comprises the signaling network, which, in the form of an Ethernet network for example, realizes an internal data network of a rail vehicle. Nodes such as video cameras, video recorders and/or switching elements, also known as switches, are connected to the data network. Due to the design of rail vehicles, a topology of the data network is implemented as a linear, ring or ladder structure. The data network and its nodes are configured to communicate with one another in a hardwired and/or wireless manner and to transmit and/or receive data streams.

The data network is configured or intended to be configured in such a way that respective data streams of a video camera run to an assigned video recorder. By means of the described method, an assignment between video camera and video recorder is established automatically, removing the need for any manual assignment. An assignment is accomplished in an automated manner, for example at a system start of the video monitoring system. Signaling-related changes can also be carried out in the video monitoring system by means of the method, such that, for example, a response to a failure of a network connection or a video recorder can be initiated dynamically and a reassignment of the assigned video camera can be effected automatically.

It has been recognized in connection with the present invention that video recorders are preferably to be distributed in the data network in such a way that a bandwidth requirement of individual video streams at nodal points, called Ethernet switches, does not exceed a maximum transmittable bandwidth. A further factor to be taken into account when connecting video recorders to the data network is the performance capacity of the latter. This includes for example the knowledge of a maximum number of recordable video streams in the video monitoring system. In addition, it is necessary to comply with data security requirements, for example redundant recordings or data storage of video streams in a different car of the rail vehicle than that in which the video camera is arranged or in which the video data is acquired.

The automatic assignment of a respective video camera to a respective video recorder is accomplished by means of the described method in such a way that there is a minimum loading of network sections of the data network between network nodes and video recorders and at the same time the data security requirements are observed. Furthermore, in the event of a failure of individual video recorders in the video monitoring system comprising a plurality of video recorders, the described method enables an automatic continuation of the recording of the assigned video cameras as a result of a dynamic reassignment.

A preferred development of the method relates to a data network comprising at least a first and a second video camera as well as a first and a second video recorder which can be coupled to one another for signaling purposes. According to the method, a respective signal path is determined for the first and second video camera of the data network such that the first video camera is assigned to the first video recorder and the second video camera is assigned to the second video recorder. Such an assignment then corresponds to a bandwidth-optimized assignment between video cameras and video recorders according to the determined topology of the network. The topology is provided for example by a database or a data storage means for the video monitoring system and is loaded as necessary in order to perform the method.

According to a further development, the method comprises a monitoring of a functional state of the first and the second video recorder of the network and an automatic reassignment of the first video camera to the second video recorder in the event that a failure of the first video recorder of the network is detected on the basis of the monitoring. Alternatively, the second video camera is automatically reassigned to the first video recorder in the event that a failure of the second video recorder of the network is detected on the basis of the monitoring. Such a reassignment is performed in particular in coordination with available bandwidths for data streams in lines, through nodal points and/or further nodes of the network.

According to a further preferred development of the method, determining a respective signal path comprises evaluating node data of the nodes in the network, said node data including information in each case about signaling-related bandwidths for data streams of the nodes. The method further comprises determining a respective signal path for a respective video camera of the network on the basis of the evaluated node data. For example, node data is stored in a data storage means of the video monitoring system and/or can be queried from the connected nodes as necessary by a control unit of the video monitoring system. The node data also comprises for example information in relation to a signaling-related hierarchy, path costs and IP addresses which specify the location of elements in the data network from the signaling viewpoint. In this way, a clear and reliable assignment can be determined to provide a beneficial distribution of data streams.

According to a further development, the method comprises executing a network protocol and determining bandwidths of data streams flowing between nodes in the network. The method further comprises determining a respective signal path and assigning a respective video camera of the network on the basis of the determined bandwidths in the network. In this way, for example, a respective video camera is allocated a particular signal path in coordination with available bandwidths and other nodes, which signal path assigns the respective video camera to a respective video recorder. It is also possible in this case for a number of video cameras to be automatically assigned to a common video recorder if such an assignment proves beneficial.

Determining a respective signal path comprises, for example, determining path costs of the respective signal path. The respective video camera is then assigned to a respective video recorder on the basis of the determined path costs, for example. In this case the path costs take into account, for example, a number of network nodes through which the data streams pass and the presence of further services which occupy the signal paths with a respective bandwidth.

According to a development of the method, determining the topology and identifying the nodes of the network comprises determining a signaling-related coupling element between the at least one video camera and the at least one video recorder. Thus, for example, Ethernet switches are taken into account which, as electronic switching elements, enable a plurality of connected nodes of the network to be processed and forwarded. A data transfer by means of such a switch is therefore preferably coordinated with other services whose data streams also pass through said switch.

Determining the topology of the signaling network comprises, for example, generating a topology graph which represents a signaling-related map structure containing information about the nodes and configured or configurable signal paths of the network. Such a graph is provided, for example, by a database or stored in a data storage means of the video monitoring system and comprises a plurality of information in relation to the data network and its nodes, such as, for example, the locations where video cameras, video recorders and network nodes are installed. It is thus possible to determine an optimal assignment of the nodes of the data network on the basis of the topology graph.

A further aspect of the invention relates to a device for operating a video monitoring system for a rail vehicle which is configured to perform one of the above-described methods. The device for example implements a control or supervision unit and is for example a part of the video monitoring system. Alternatively, the device is for example a higher-level control device which enables signals and/or information of the video monitoring system to be processed.

According to a further aspect, a rail vehicle has a car body and a video monitoring system which is coupled to the car body, wherein the video monitoring system is assigned to an interior of the car body and comprises at least one video camera and one video recorder. The rail vehicle further comprises an embodiment of the above-described device which is configured for operating the video monitoring system. Because the device is embodied to perform one of the above-described methods for operating the video monitoring system and the rail vehicle comprises an embodiment variant of the device, described characteristics and features of the method are also disclosed for the device and for the rail vehicle, and vice versa.

The described method enables a bandwidth-optimized, dynamic assignment of video data streams of one or more video cameras of the video monitoring system, which assignment can be accomplished in particular in an automated manner without manual intervention. Accordingly, it is not necessary to carry out a fixed assignment of video cameras that implements a predefined project planning and configuration scheme. Thanks to the described method, such a manual specification by a project manager can be dispensed with. Furthermore, a reallocation of a video camera is likewise performed automatically in the event, for example, of a failure of a video recorder assigned to the video camera or video cameras. Accordingly, a corresponding manual respecification and distribution of the video cameras to other video recorders can likewise be dispensed with. This contributes toward a reliable and failsafe recording of video data.

In the case of data networks which are not available for the exclusive use of the video monitoring system and which implement so-called shared networks, it is also necessary to take account of the data traffic of other network nodes. By means of the described method it is possible to take the data traffic of different nodes into consideration in the automated project planning and configuration and thereby counteract a system overload and associated faults during the recording of video data.

The described method can be performed for example by means of a topology service that is placed in the data network. Such a topology service is for example part of a rail vehicle server system and is also used for example for consequential fault suppression of a diagnostic system. According to the described method, the functionality of an existing topology service in a conventional rail vehicle can be expanded so that existing systems can be extended in a simple and cost-effective manner in order to enable the described method to be carried out.

The topology service knows all the nodes in the data network, for example, as well as their signaling-related neighbors. Accordingly, all of the signaling nodes and edges of the topology graph represented by the data network are known. The topology service also possesses, for example, details on the bandwidth used by the connected systems or nodes. In relation to CCTV video cameras, this is for example the maximum bandwidth of the sent video transmissions. In relation to digital video recorders, this is for example the maximum receivable or recordable bandwidth of video transmissions.

The video cameras and video recorders are in particular components of a CCTV system for a rail vehicle which for example embodies a self-contained video monitoring system. For example, video cameras are provided in such a way that video transmissions can be recorded redundantly. This means that some or each of the CCTV video cameras send their or sends its data streams to two or more video recorders simultaneously. In addition, specifications on the local separation of video camera and video recorder are provided, for example, so that, for example, a video recorder is arranged in a car of a rail vehicle next to the car in which the assigned CCTV video camera is provided. Such specifications are also stored for example in a topology determination unit or a topology service and are taken into account during the determination of the optimal signal path for signaling purposes for a respective video camera.

On the basis of such system data of the topology service, the latter generates a topology graph which serves for calculating the shortest path between the respective CCTV video cameras and the available video recorders. The shortest path in this case represents for example a path having the lowest path costs and the lowest loading of nodes, in particular switches, present in the data network.

The signal path is calculated for example according to established shortest path algorithms, such as Dijkstra, for example. In this way it is possible by means of the described method to achieve an optimal assignment of the respective CCTV video cameras to the available digital video recorders such that the video data streams for example have to pass through as few network nodes and other signaling-related obstacles as possible.

The video monitoring system further comprises for example a monitoring unit or a monitoring service which can also be specifically incorporated into the described method and in particular enables the bandwidths of data streams between nodes of the network to be monitored. Data of the system containing information about the nodes, for example, is optionally incorporated into such a monitoring service, for example.

The monitoring service then runs for example alongside the topology service centrally in the data network and, by means of a network management protocol, for example via SNMP-get, cyclically polls occupied bandwidths of connections between two nodes, such as the network nodes or switches. In this way, for example, current bandwidth values are determined that can be taken into account for operating the video monitoring system. For example, the bandwidth of the video data streams is subtracted from the determined bandwidth values so that an occupied bandwidth is presented without CCTV video data streams. Said values of an occupied bandwidth can be added as extras to path costs of a signal path of the topology service. The path costs take into account, among other things, a connection between network nodes or switches of the data network that is advantageous for signaling purposes.

The described method removes the need for an assignment of video camera and video recorder during a project planning and configuration phase. The assignment is effected in an automated manner at the time of a system start, for example, or when changes are made in the video monitoring system. A change is triggered for example by a failure of a network connection or a video recorder.

The distribution of the video data streams is handled in such a way that the loading of the network nodes or Ethernet switches and the connection between these are optimized or minimized. The connection between network nodes is also referred to by the term "trunk connection".

According to the described method, it is possible to configure a CCTV video monitoring system in such a way that one or more digital video recorders can fail and the video data streams recorded by these in each case are then assigned reliably and securely to the remaining video recorders. It is therefore possible by means of the method to respond dynamically to the failure of one or more video recorders. In particular, a maximum recordable bandwidth of the video recorder or video recorders is taken into account as a limitation in this case. It is furthermore possible by means of an integrated monitoring service or a bandwidth monitoring unit to take into account an actually available bandwidth and to avoid or prevent bottlenecks, for example in the case of shared data networks.

The aforementioned characteristics, features and advantages of the invention and the manner in which these are achieved are explained in more detail by the following description of the exemplary embodiments of the invention taken in conjunction with the corresponding figures, in which:

DETAILED DESCRIPTION OF THE INVENTION

Elements of like construction and function are labeled with the same reference signs throughout the figures. For clarity of illustration reasons it may be that not all the elements in all of the figures are labeled with associated reference signs.

Figure 1:
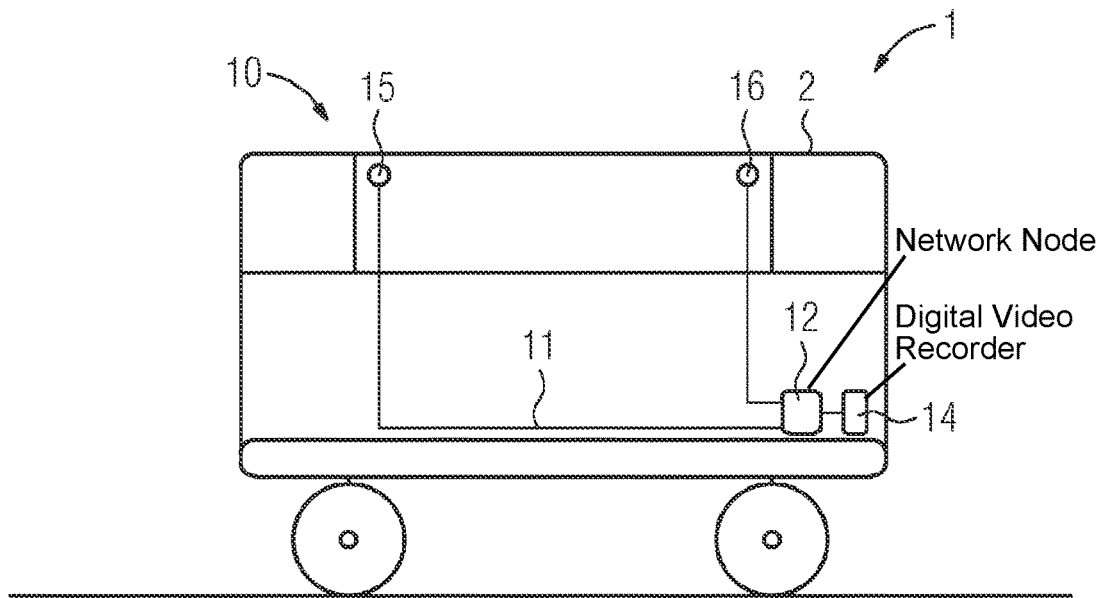
FIG. 1 shows a schematic view of a rail vehicle having a video monitoring system.

FIG. 1 shows a schematic side view of a rail vehicle 1 having a video monitoring system 10 that comprises two video cameras 15 and 16 which are coupled for signaling purposes to a network node 12 and a digital video recorder 14. The video cameras 15 and 16, as well as the network node 12 and the video recorder 14, form nodes of a data network 11 which realizes, for example, an Ethernet network of the rail vehicle 1. The video monitoring system 10 is assigned to an interior of a car body 2 of the rail vehicle 1 and enables the vehicle interior to be monitored. It is implemented for example as a CCTV surveillance system which represents a self-contained video monitoring system.

As will be explained below with reference to FIGS. 2 and 3, a method for operating the video monitoring system 10 enables reliable and secure data processing of video signals or video data streams and can contribute toward a failsafe or low-failure operation of the video monitoring system 10 and play a part in providing increased safety and reliability for use of the rail vehicle 1.

Figure 3:
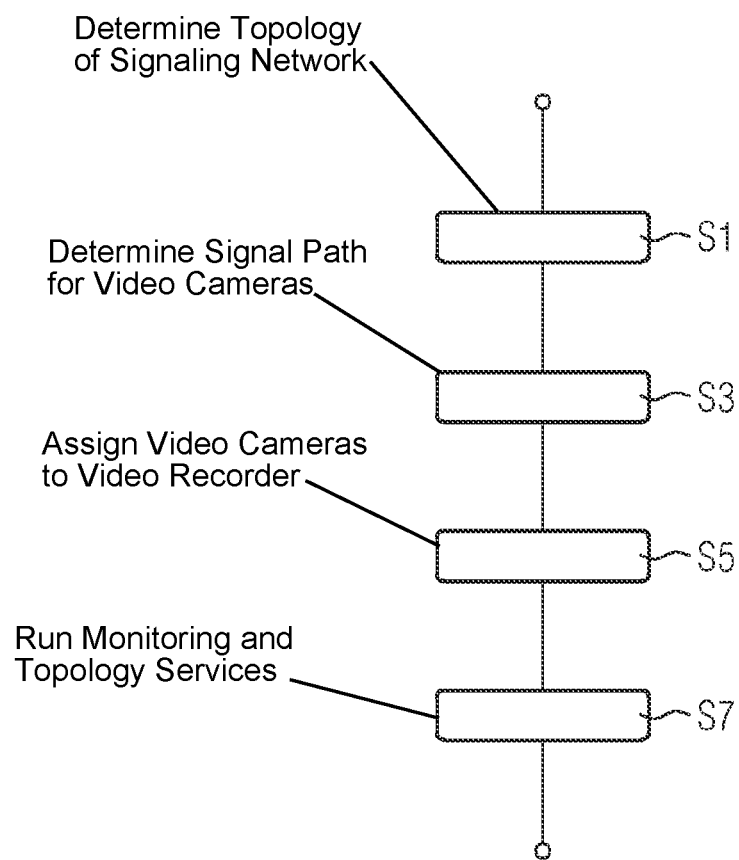
FIG. 3 shows a flowchart for a method for operating the video monitoring system for the rail vehicle.

The method for operating the video monitoring system 10 can be carried out according to the flowchart shown in FIG. 3. In a step S1, a topology of the signaling network 11 assigned to the video monitoring system 10 is determined. Nodes 12, 14, 15, 16 that are coupled to the network 11 for signaling purposes are identified.

In a further step S3, a signal path is determined for each of the video cameras 15 and 16 on the basis of the determined topology of the network 11. The respective signal path represents an assignment of the respective video camera 15, 16 to a respective video recorder 14 for signaling purposes.

In a further step S5 of the method, the video cameras 15 and 16 are then automatically assigned to the video recorder 14 in accordance with the respective determined signal path.

In the exemplary embodiment according to FIG. 1, both video cameras 15 and 16 are assigned to the one video recorder 14.

Figure 2:
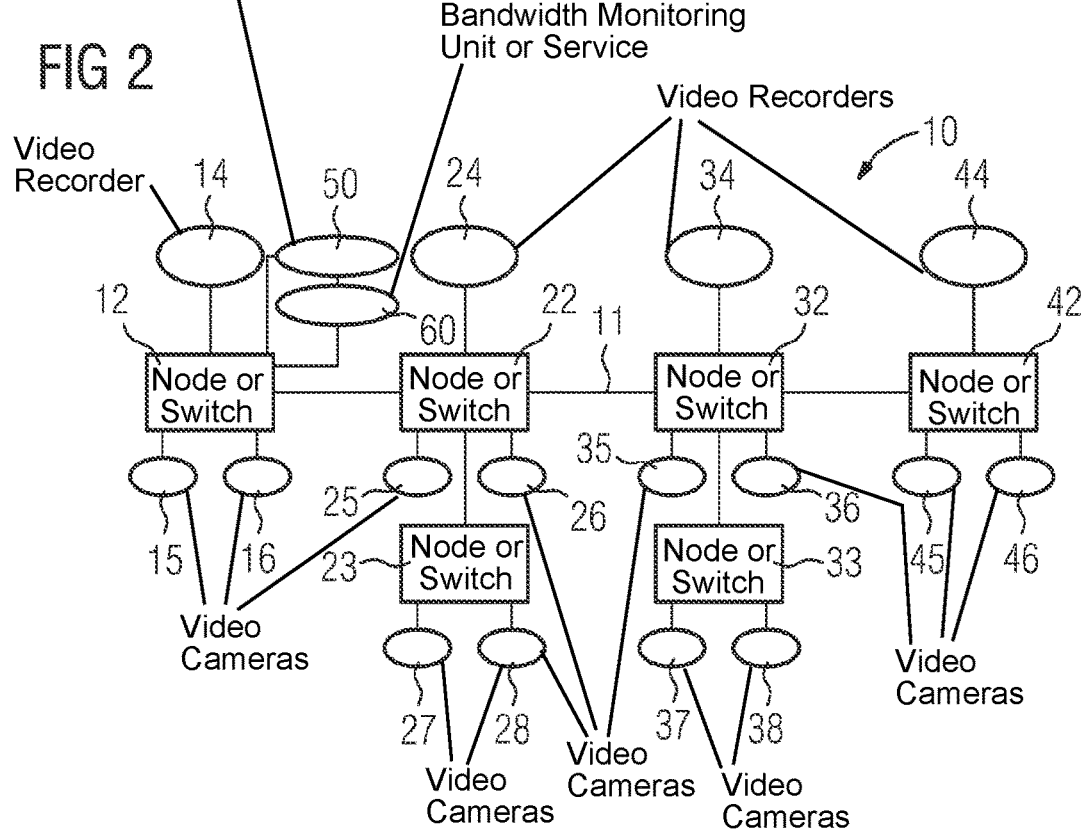
FIG. 2 shows an exemplary embodiment of a video monitoring system for the rail vehicle.

FIG. 2 shows a further exemplary embodiment of the video monitoring system 10 comprising a plurality of video cameras 15-46, video recorders 14-44 and network nodes or switches 12-42. The video cameras 15 and 16 are coupled to the video recorder 14 and the further network nodes by means of a switch 12. The video cameras 25 and 26 are coupled to the video recorder 24 and the further network nodes by means of a switch 22. The video cameras 27 and 28 are coupled by means of a switch 23 to the switch 22 and by means of the latter to the further network nodes.

The video cameras 35 and 36 are coupled to the video recorder 34 and the further network nodes by means of a switch 32. The video cameras 37 and 38 are coupled by means of a switch 33 to the switch 32 and by means of the latter to the further network nodes. The video cameras 45 and 46 are coupled to the video recorder 44 and the further network nodes by means of a switch 42.

According to the exemplary embodiment illustrated in FIG. 2, twelve video cameras 15-46, four video recorders 14-44 and six switches 12-42 are therefore provided, thereby forming the data network 11. Accordingly, there are a multiplicity of possible assignments of the video cameras 15-46 and video recorders 14-44. For example, the video camera 15 can be assigned to the video recorder 14 by means of the switch 12, while the video camera 16 is allocated to the video recorder 24 by means of the switch 12 and the switch 22. Alternatively, the video recorder 44 can also be provided to record the video data streams of the video camera 16.

By means of the described method it is possible to implement an automated assignment and adapt the same dynamically to the state of the video monitoring system 10. This therefore saves having to carry out a manual assignment. A topology and a signal path are determined for example in a topology determination unit 50, which may also be referred to as a topology service.

The topology service 50 knows all the nodes in the data network 11, for example, as well as their signaling neighbors and/or has the capability to determine the nodes and their signaling position in the data network 11. Accordingly, all of the signaling nodes 12-42 and edges of the topology graph represented by the data network 11 are known. The topology service 50 also possesses, for example, details on the bandwidth used by the connected systems or nodes. In relation to the video cameras 15-46, this is for example the maximum bandwidth of the transmittable video data streams. In relation to the digital video recorders 14-44, this is for example the maximum receivable or recordable bandwidth of video transmissions.

Video cameras 15-46 are provided for example such that video transmissions can be recorded redundantly. This means that some or each of video cameras 15-46 send their or sends its video data streams to two or more video recorders 14-44 simultaneously. In addition, specifications on the local separation of video cameras 15-46 and video recorders 14-44 are provided, for example, so that the video recorder 44, for example, is arranged in a car body of the rail vehicle 1 next to the car body 2 in which the assigned CCTV video camera 16 is provided. Such specifications are also stored for example in a topology determination unit 50 and are taken into account in the determination of the optimal signal path in signaling terms for a respective video camera 15-46.

On the basis of such system data of the topology service 50, the latter generates a topology graph, which serves for calculating the shortest path between the respective video cameras 15-46 and the available video recorders 14-44. The shortest path in this case represents for example a signal path having the lowest path costs and the lowest loading of nodes, in particular switches 12-42, present in the data network 11. The signal path is calculated for example according to established shortest path algorithms, such as Dijkstra, for example. In this way it is possible by means of the described method to allocate the respective video cameras 15-46 to the available digital video recorders 14-44 in an optimal manner such that the video data streams for example have to pass through as few network nodes 12-42 and other signaling-related obstacles as possible.

According to the exemplary embodiment illustrated in FIG. 2, the video monitoring system 10 further comprises a monitoring unit 60, which may also be referred to as a monitoring service and which can also be specifically incorporated into the described method. The monitoring service 60 enables the bandwidths of data streams between nodes of the network 11 to be monitored. Data of the video monitoring system, for example containing information about the nodes, is optionally included in such a monitoring service 60, for example.

According to the flowchart shown in FIG. 3, the monitoring service 60 runs alongside the topology service 50 in a step S7, for example, and, by means of a network management protocol, for example via SNMP-get, cyclically polls occupied bandwidths of connections between two nodes, such as the network nodes or switches 12-42. In this way, for example, current bandwidth values are determined that are taken into account for operating the video monitoring system 10. For example, the bandwidth of the video data streams is subtracted from the determined bandwidth values so that an occupied bandwidth is presented without video data streams. Said values of an occupied bandwidth can be added as extras to path costs of a signal path of the topology service 50.

By means of the described method it is therefore possible to rule out or counteract project planning and configuration errors and to avoid an overloading of network nodes 12-42. The described method enables a bandwidth-optimized, dynamic assignment of video data streams of one or more video cameras 15-46 of the video monitoring system 10, which assignment can be realized in particular in an automated manner without manual intervention. It is therefore not necessary to carry out a fixed assignment of video cameras and to predefine a project planning and configuration scheme.

Although the invention has been illustrated and described in detail on the basis of exemplary embodiments, the invention is not limited to the disclosed exemplary embodiments and the actual feature combinations explained therein. Further variations of the invention may be derived by a person skilled in the art without leaving the scope of protection of the claimed invention.

LIST OF REFERENCE SIGNS

1 Rail vehicle
2 Car body of the rail vehicle
10 Video monitoring system
11 Network of the video monitoring system
12, 22, 32, 42 Network node/switch of the network
23, 33 Network node/switch of the network
14, 24, 34, 44 Video recorder 15, 25, 35, 45 Video camera
16, 26, 36, 46 Video camera
27, 37 Video camera
28, 38 Video camera
50 Topology determination unit
60 Bandwidth monitoring unit
S (i) Step of a method for operating a video monitoring system for the rail vehicle

The invention claimed is:

1. A method for operating a video monitoring system for a rail vehicle, the method comprising:
    determining a topology of a signaling network assigned to the video monitoring system, and identifying nodes coupled to the network for signaling, the at least one video camera and the at least one video recorder being nodes of the network;
    determining a signal path for the at least one video camera of the network based on the determined topology of the network, the signal path representing a signaling-related assignment of the at least one video camera; and
    automatically assigning the at least one video camera to the at least one video recorder based on the determined signal path.

2. The method according to claim 1, which further comprises providing the network with at least a first and a second video camera as well as at least a first and a second video recorder to be coupled to one another for signaling, and determining a respective signal path for the first and second video cameras of the network by assigning the first video camera to the first video recorder and assigning the second video camera to the second video recorder.

3. The method according to claim 2, which further comprises:
    monitoring a functional state of the first and the second video recorders of the network; and
    automatically reassigning the first video camera to the second video recorder upon detecting a failure of the first video recorder of the network during the monitoring, or automatically reassigning the second video camera to the first video recorder upon detecting a failure of the second video recorder of the network during the monitoring.

4. The method according to claim 1, which further comprises including in the determination of the signal path:
    evaluating node data of the nodes of the network including information about respective signaling-related bandwidths for data streams of the nodes; and
    determining a signal path for a respective video camera of the network based on the evaluated node data.

5. The method according to claim 1, which further comprises:
    executing a network protocol and determining bandwidths of data streams flowing between nodes in the network; and
    determining a signal path and assigning a respective video camera of the network to a video recorder based on the bandwidths determined in the network.

6. The method according to claim 1, which further comprises including in the determination of the signal path:
    determining path costs of the signal path; and
    assigning a respective video camera to a respective video recorder based on the determined path costs.

7. The method according to claim 1, which further comprises including in the determination of the topology and the identification of the nodes of the network:
    determining a signaling-related coupling element between the at least one video camera and the at least one video recorder.

8. The method according to claim 1, which further comprises including in the determination of the topology of the signaling-related network:
    generating a topology graph representing a signaling-related map structure including information about the nodes and configured or configurable signal paths of the network.

9. A device for operating a video monitoring system for a rail vehicle, the device configured to perform the method according to claim 1.

10. A rail vehicle, comprising:
    a car body having a vehicle interior;
    a video monitoring system coupled to said car body, said video monitoring system being assigned to said vehicle interior, and said video monitoring system including at least one video camera and at least one video recorder; and
    said device according to claim 9 for operating said video monitoring system.

* * * * *